United States Patent [19]

Bortolin

[11] Patent Number: 4,882,450

[45] Date of Patent: Nov. 21, 1989

[54] POLYSILANES

[75] Inventor: Roberto Bortolin, Brighton, United Kingdom

[73] Assignee: Dow Corning Limited, London, England

[21] Appl. No.: 128,243

[22] Filed: Dec. 3, 1987

[30] Foreign Application Priority Data

Dec. 11, 1986 [GB] United Kingdom ................. 8629593

[51] Int. Cl.[4] ................................................ C07F 7/08

[52] U.S. Cl. ...................................... 556/430; 528/14; 528/40; 528/43

[58] Field of Search ..................... 556/430; 528/40, 14, 528/43

[56] References Cited

U.S. PATENT DOCUMENTS

| | | | |
|---|---|---|---|
| 2,380,995 | 8/1945 | Rochow | 260/607 |
| 4,052,430 | 11/1976 | Yajima et al. | 260/448.2 D |
| 4,298,559 | 11/1981 | Baney et al. | 556/430 X |
| 4,310,651 | 1/1982 | Baney et al. | 556/430 X |
| 4,590,253 | 5/1986 | Hasegawa et al. | 528/14 |
| 4,719,273 | 1/1988 | Seyferth et al. | 556/430 X |

FOREIGN PATENT DOCUMENTS

| | | | |
|---|---|---|---|
| 2077710 | 12/1981 | United Kingdom | 556/430 |

*Primary Examiner*—Paul F. Shaver
*Attorney, Agent, or Firm*—James E. Bittell

[57] ABSTRACT

Polysilanes of the general formula $(RSi)_n$ wherein R is an alkyl, aryl, alkaryl or aralkyl group having 4 to 18 carbon atoms and where n has a value of at least 8, are soluble in a liquid organic medium when R is a stearically hindered or large group. Compositions comprising the organic liquid medium and dissolved therein the polysilane are also described.

11 Claims, No Drawings

POLYSILANES

The invention relates to novel polysilanes.

Polysilanes have been known for a long time and include different types of materials. Examples of known polysilanes are linear permethylated polysilanes, cyclic permethylated polysilanes, branched polysilanes and cage permethyl polysilanes. Certain polysilanes with substituents other than methyl for example phenyl and isobutyl groups are also known, as are polysilanes having a mixture of methyl and other substituents, for example hydrogen, halogen or phenyl substituents. Also known are polysilanes where only hydrogen atoms are found on the silicon atoms. The size of polysilanes can vary widely from the disilane to polysilanes having a large number of silicon atoms attached to each other. Linear polysilanes have usually less than 10 silicon atoms in the chain, whilst cyclic and polycyclic polysilanes often have a large number of silicon atoms. G.B. specification No. 2 081 290 describes polysilanes having the average formula$[(CH_3)_2Si][CH_3Si]$ in which polysilane there are from 0 to 60 mole percent $(CH_3)_2Si=$units and 40 to 100 mole percent $CH_3Si$ units, wherein there is also bonded to the silicon atom other silicon atoms and additional alkyl radicals of 1 to 4 carbon atoms or phenyl.

It is an object of the present invention to provide novel polysilanes. Accordingly the invention provides a polysilane of the general formula $(RSi)_n$ wherein each R is independently selected from the group consisting of alkyl, aryl, alkaryl or aralkyl group having from 4 to 18 carbon atoms and n has a value of at least 8.

In the general formula of the polysilanes of this invention R may be for example butyl, pentyl, octyl, dodecyl, hexadecyl, phenyl, naphthyl, tolyl, phenylethyl, methylphenyl and propylphenyl.

Polysilanes generally can be prepared by several routes. One of the earliest published methods was that described in U.S. Pat. No. 2 380 995 in the name of Rochow, in which disilanes were produced by contacting silicon metal with an alkylhalide under specified conditions. The most common route for the production of cyclopolysilanes involves the reductive condensation of a dialkyldihalosilane with an alkali metal. This has been described in many articles and patent specifications, for example U.S. Pat. No. 4 052 430. If an alkyltrihalosilane is included in the reaction mixture as described above co-condensation of these silanes can form cage polysilanes under certain conditions. Another route for making polysilanes employs low molecular weight polysilanes which are reacted under anhydrous conditions with a Grignard reagent, as described for example in G.B. specification No. 2 081 290. Such low molecular weight polysilanes are those present in the direct process residue obtained during the commercial production of chlorosilanes. However, the direct process residue is not pure or well defined and the preparation of polysilanes therefrom involves the extra step of purification of the direct process residue.

The polysilanes of the present invention may be prepared by a process wherein at least one trihalosilane is reacted with an alkali metal in an organic liquid medium. The trihalosilanes which can be used in the process have the general formula $RSiX_3$ wherein R is as defined above and X is a halogen atom, preferably Cl. Such silanes are well known in the art and they may be prepared e.g. by Grignard synthesis or by the addition of unsaturated alkenes or aromatic compounds to silanes having a silicon-bonded hydrogen atom. Such processes are well known and have been described in e.g. Chemistry and Technology of Silicones by W. Noll. Examples of the trihalosilanes which may be used in the process of the invention include for example phenyltrichlorosilane, tertiary butyltrichlorosilane and dodecyltrichlorosilane.

The alkali metal which may be used in such process can be e.g. Na, K and Li. Li is the preferred metal as it gives the highest yield of polysilanes. The amount of alkali metal used in the reaction is about three moles per mole of the silane utilised. In order to ensure the completion of the reaction it is preferred to add a slight excess of the alkali metal.

The organic liquid medium in which the reaction takes place may be any solvent in which the trihalosilane reactant is soluble. Preferably the organic liquid medium is also a solvent for the polysilanes of the invention. These solvents include hydrocarbon solvents such as toluene or paraffins, ethers such as tetrahydrofuran and dioxan and nitrogen containing solvents such as ethylenediamine. Preferably tetrahydrofuran is used. The by-product alkali metal halides are normally insoluble and these can be easily removed by filtration. The amount of solvents used in the process is not critical although larger amounts of solvent can result in lower molecular weight polysilanes.

The process may be carried out at any temperature but preferably the reaction temperature is maintained below 50° C. The reaction which occurs is exothermic and is preferably initiated at room temperature, no external heat being supplied, during the reaction. As the temperature is increased an increase in the molecular weight of the formed polysilanes is usually observed.

When the reaction has proceeded to the desired degree the polysilane may be recovered from the reaction mixture by any suitable method. If the polysilane is soluble in the solvent other insolubles can be removed by filtration and the polysilane can be retained in the solvent, purified by washing or dried to a powder.

The polysilanes of this invention are solid materials having a three dimensional structure wherein every silicon atom is linked to at least one other silicon atom and possibly to an R group. The exact structure of the polysilane has not been defined but is believed to include such structures as dodecahedron and open cage structures.

One of the more important uses of polysilanes is their use as precursors for silicone carbide. It is desirable to shape these polysilanes prior to their transformation. It is therefore preferred that the polysilanes should be soluble in a liquid carrier material such as an organic solvent. However, it has proved difficult to prepare polysilanes with a silicon to carbon ratio of 1 in a way that they are soluble in most solvents.

We have now found that those polysilanes of the invention wherein R is a large or sterically hindered alkyl, aryl, aralkyl or alkaryl group are soluble at ambient temperature in certain organic liquid media. Such polysilanes are preferred and accordingly the invention provides in another of its aspects polysilanes of the general formula $(RSi)_n$ wherein R is selected from the group consisting of large alkyl, aryl, alkaryl, aralkyl, sterically hindered alkyl, sterically hindered aryl, sterically hindered alkaryl and sterically hindered aralkyl as hereinabove defined and which is soluble in an organic liquid medium at ambient temperature. The invention also provides a composition comprising an organic liquid medium and dissolved therein a polysilane of the general formula $(RSi)_n$, wherein R and n are as defined for the preferred polysilanes.

In these preferred polysilanes R may be a large and/or sterically hindered alkyl, aryl, alkaryl or aralkyl group as herein defined. By the expression 'sterically hindered' is meant those groups which are branched or cyclic for example cycloalkyl groups, isobutyl, isopentyl, neopentyl, tertiary butyl and 2,4,6 trimethylphenyl and having at least 4 carbon atoms. By the expression 'large' group is meant those having more than 5 carbon atoms. The most preferred polysilanes of the invention are those wherein R represents tertiary butyl or phenyl. The maximum value of n to ensure the solubility of the preferred polysilanes at ambient temperature is dependent on the nature of R. For example phenylpolysilanes of the invention are soluble in an organic liquid medium when n has a value not higher than 30, whilst t-butylpolysilanes are still soluble when n has a value of 68.

Suitable organic liquid media in which such preferred polysilanes are soluble include hydrocarbon, ether and nitrogen containing solvents. Examples of such solvents are toluene, paraffins, such as hexane and dodecane, tetrahydrofuran, dioxan, ethylenediamine, triethylamine and N,N,N',N'-tetramethylethylenediamine. Their solubility enables such polysilanes to be shaped more easily when they are employed for example as precursors in the formation of silicon-carbide articles or surface coatings.

The following examples in which parts and percentages are expressed by weight, t-Bu denotes a tertiary butyl group and Ph denotes a phenyl group, illustrate the invention.

EXAMPLE 1

To a suspension of Li (2.8 g, 0.4 mole) in 100 ml of tetrahydrofuran (Thf) a solution of $PhSiCl_3$ (27.6 g, 0.13 mole) in 100 ml of Thf was slowly added. The mixture warmed up as the exothermic reaction took place and became dark brown. When all the solution had been added the mixture was stirred for a further 3 hours at ambient temperature. The excess Li and LiCl which was formed were filtered off and the filtrate was poured into 800 ml of methanol. A precipitate formed and this was filtered off, washed with water and methanol and dried under vacuum. The reaction yielded 10.58 g of a polysilane solid material. Analysis of this material showed 67.35% C and 4.71% H. The molecular weight was determined by GPC as 2276. Infrared and NMR analysis showed the presence of Ph and Si-Ph and Si-Si bonds.

EXAMPLE 2

To a suspension of Li (2.25 g, 0.32 mole) in 100 ml of tetrahydrofuran (Thf) a solution of t-BuSiCl 18.62 g, 0.097 mole) in 100 ml of Thf was slowly added. The mixture warmed up as the exothermic reaction took place and became dark brown. When all the solution had been added the mixture was stirred for a further 6 hours at ambient temperature. The excess Li and the LiCl which was formed were filtered off and the filtrate was poured into 1000 ml of methanol. A precipitate formed and this was filtered off, washed with water and methanol and dried under vacuum. The reaction yield 6.86 g of a solid polysilane material. Analysis of this material showed 54.95% C and 9.83% H. The molecular weight was determined by GPC as 5854. Infrared and NMR analysis showed the presence of t-Bu and Si-C bonds.

That which is claimed is:

1. A polysilane of the general formula (RSi)n wherein each R is independently selected from the group consisting of alkyl, aryl, alkaryl and aralkyl groups having from 4 to 18 carbon atoms and n has a value of at least 8.

2. A polysilane according to claim 1 wherein each R is the same.

3. A polysilane according to claim 1 wherein each R is independently selected from the group consisting of large alkyl, large aryl, large alkaryl, large aralkyl, sterically hindered alkyl, sterically hindered aryl, sterically hindered alkaryl and sterically hindered aralkyl wherein large means those groups having more than 5 carbon atoms and sterically hindered means those groups which are branched or cyclic and wherein said polysilane is soluble in an organic liquid medium at ambient temperature.

4. A polysilane according to claim 3 wherein R is tertiary butyl and n has a value of from 8 to 68.

5. A polysilane according to claim 3 wherein R is phenyl and n has a value of from 8 to 30.

6. A composition comprising a polysilane according to claim 3 and an organic liquid medium in which the polysilane is dissolved.

7. A composition comprising a polysilane according to claim 4 and an organic liquid medium in which the polysilane is dissolved.

8. A composition comprising a polysilane according to claim 5 and an organic liquid medium in which the polysilane is dissolved.

9. A composition according to claim 6 wherein the organic liquid medium is tetrahydrofuran.

10. A composition according to claim 7 wherein the organic liquid medium is tetrahydrofuran.

11. A composition according to claim 8 wherein the organic liquid medium is tetrahydrofuran.

* * * * *